April 16, 1940.    W. W. SLOANE    2,197,512
SUPPORT FOR CONVEYER TROUGHS OF THE RECIPROCATING OR SHAKER TYPE
Filed May 18, 1936
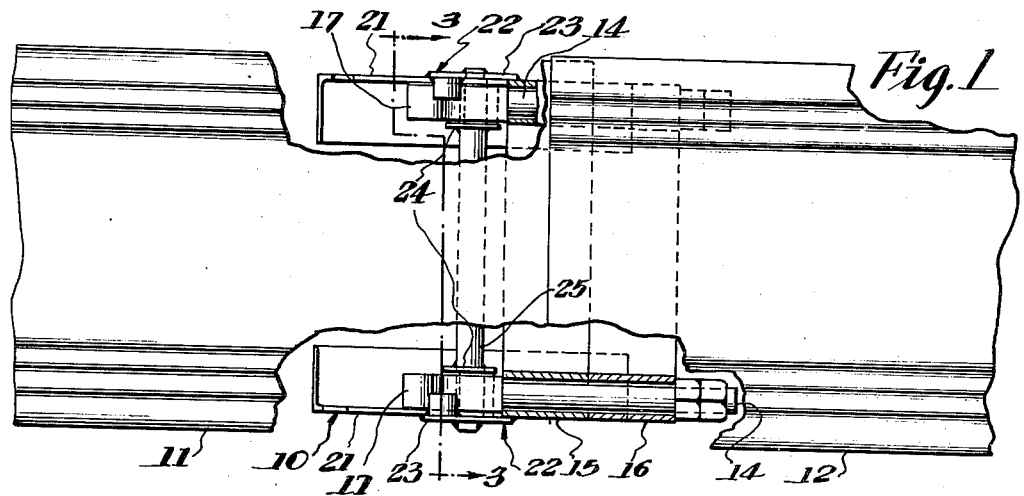
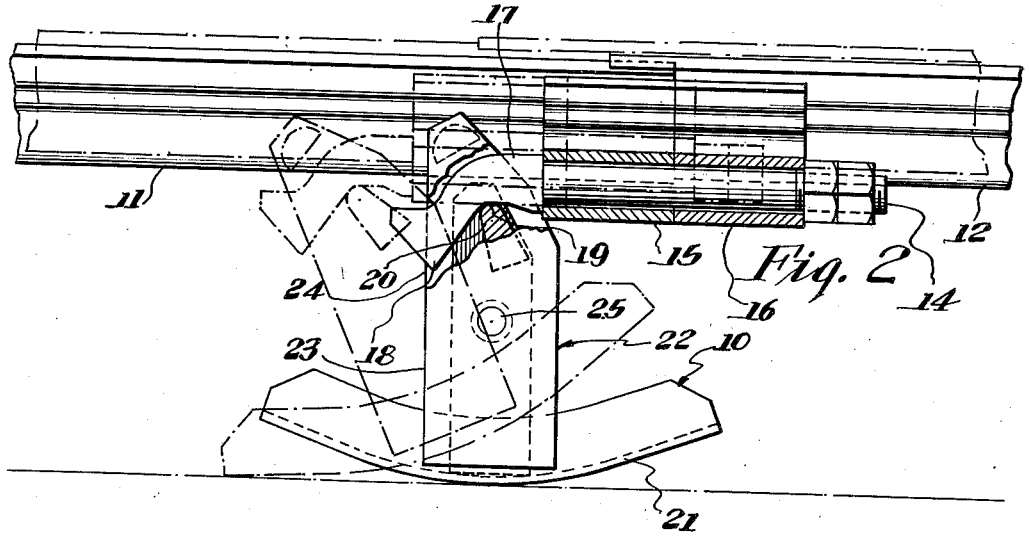
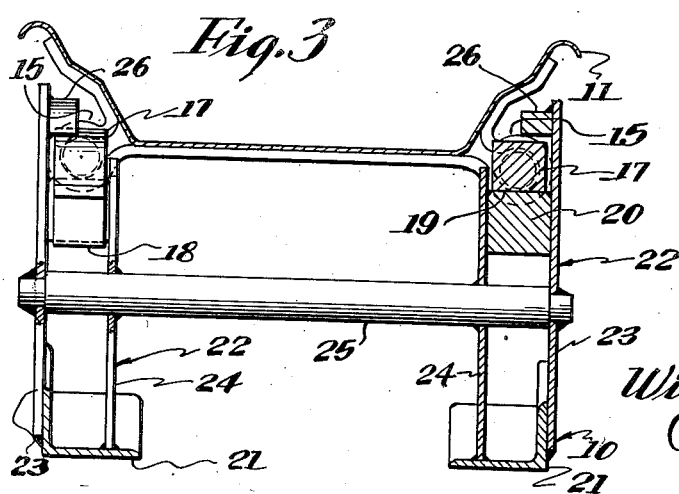
Inventor
William W. Sloane
Clarence F. Poole
Attorney Patented Apr. 16, 1940

2,197,512

UNITED STATES PATENT OFFICE 2,197,512

SUPPORT FOR CONVEYER TROUGHS OF THE RECIPROCATING OR SHAKER TYPE

William W. Sloane, Chicago, Ill., assignor to Goodman Manufacturing Company, Chicago, Ill., a corporation of Illinois Application May 18, 1936, Serial No. 80,300

16 Claims. (Cl. 198—220)

This invention relates to improvements in conveyers of the reciprocating or shaker type particularly adapted for transporting coal or the like from one place to another.

Among the objects of my invention are to provide a support for a shaker conveyer trough line of a simple, novel and efficient construction, which does away with complicated mechanical parts, such as rollers, balls, etc., formerly used.

Another object of my invention is to provide a support means for conveyer trough lines of the class described which supports the trough line on the bolts connecting adjacent conveyer troughs together, in a simplified and effective manner.

Another object of my invention is to provide a rocking frame for supporting the trough line, wherein the rocker is so formed and arranged with respect to the supporting connection to the trough line that the frame is self-centering.

Still another object of my invention is to provide a novel form of supporting connection between the rocking frame and trough line which permits a relatively loose rolling supporting connection between the connecting bolts and rocking frame to be maintained and prevents disengagement of the rocking frame from the connecting bolts.

Other objects of my invention will appear from time to time as the following specification proceeds.

My invention may be more clearly understood with reference to the accompanying drawing wherein:

Figure 1 is a top plan view of a conveyer trough line with certain parts broken away and shown in section in order to more clearly illustrate certain details of the trough supporting means which forms the subject matter of my invention;

Figure 2 is a side elevation of the device shown in Figure 1, with certain parts broken away and shown in section; and Figure 3 is a fragmentary sectional view taken substantially along line 3—3 of Figure 1.

In the drawing the embodiment of my invention illustrated includes a rocking base frame, generally indicated by reference character 10, which forms a support for adjacent ends of conveyer trough sections 11 and 12 of a conveyer trough line.

The trough sections 11 and 12, as herein shown, are of a usual overlapping construction and are connected together at their ends by connecting bolts 14, 14. Said connecting bolts are adapted to register for engagement with aligned abutting eyes 15 and 16 extending laterally from the bottom of the respective trough sections 11 and 12.

The connecting bolts 14, 14 form a means for supporting the trough sections 11 and 12 on the rocking frame 10, and are each provided with elongated heads 17, 17 having a depending end 18 which extends angularly and downwardly from the body portion of the bolt. A concave arcuate race or engaging surface 19 is formed on the lower side of said head at the point where it extends angularly downwardly away from the body of the bolt. Said engaging surface is adapted to be engaged by a convex arcuate bearing face of a bearing member 20 which has rolling bearing engagement therewith. Said bearing member is a part of the rocking frame 10 and will hereinafter be more fully described as this specification proceeds.

Referring now in detail to the construction of the rocking base frame 10, said frame, as herein shown, includes a pair of parallel-spaced rockers 21, 21, which in the form shown, are constructed from angle irons having one leg which engages the ground and a perpendicular leg which extends upwardly from the outer sides of the frame. Each of said rockers has a supporting leg 22 extending upwardly from the central portion thereof which consists in an outer upstanding member 23 and a parallel-spaced inner upstanding member 24. Said members may be secured to said rockers in any suitable manner, but are herein shown as being welded thereto. Said rockers are herein shown as being secured together to rock as a unit by means of a transversely extending shaft 25 extending through and herein shown as being welded to the legs 22, 22.

The arcuate bearing members 20, 20 are secured between the upstanding members 23 and 24 of the legs 22, 22 and are herein shown as being inclined towards the outer end of the bolt head so that one side thereof may engage the inclined lower surface of the depending portion 18 of the bolt head, and serve as a stop for the rocker when in one extreme position.

The rockers 21, 21 are so formed and arranged with respect to the bearing members 20, 20 as to prevent tipping thereof and provide a rocking frame which is self-centering. This is attained by forming the central rocking portion of each rocker in the form of an arc, the radius of which is greater than the distance from the ground to the arcuate engaging surfaces of the bearing members 20, 20, and the length of which arc is equal to the stroke of the conveyer. The outer ends of said rockers beyond the arcuate portion thereof are herein shown as being relatively flat to limit rocking movement thereof beyond a predetermined point and to prevent tipping thereof, although they may be curved in an opposite direction than the arcuate engaging surfaces of said rockers, if desired.

Suitable means are provided to hold the rocking frame 10 in engagement with the connecting bolts 14, 14 in cases where the trough line has been displaced beyond the extreme end of the stroke, as is shown by dotted lines in Figure 2. Said means, as herein shown, comprises stops 26, 26 extending inwardly from the outer upstanding members 23, 23 and spaced from the arcuate bearing members 20, 20 above the projecting heads 17, 17 of the connecting bolts 14, 14. The upper surfaces of the projecting heads 17, 17 of said connecting bolts are arranged to substantially conform to the path of movement of said stops and the outer ends thereof are upturned to engage said stops and prevent disconnection of said rocking frame from said bolts in an obvious manner.

While I have herein shown and described one form of my invention, I do not wish to be limited to the precise details of construction or arrangement of parts herein shown and described, excepting as specifically limited in the appended claims.

I claim as my invention:

1. In a reciprocating conveyer, a pair of reciprocably movable conveyer troughs, means for connecting adjacent ends of said troughs together comprising a pair of connecting bolts disposed adjacent opposite sides of said troughs, and means for supporting said troughs for reciprocation comprising a rocking frame having bearing and supporting engagement with said bolts, said rocking frame including a rocker engageable with the ground, said rocker having a ground engaging surface of a length greater than the stroke of the conveyer and having a central arcuate bottom surface of a length substantially equal to the length of stroke of the conveyer.

2. In a reciprocating conveyer, a pair of reciprocably movable conveyer troughs, means for connecting adjacent ends of said troughs together comprising a pair of connecting bolts disposed adjacent opposite sides of said troughs and each having a bearing engaging surface formed thereon, and means for supporting said troughs for reciprocation comprising a rocking frame having bearing and supporting engagement with said bearing surfaces, said rocking frame including a rocker engageable with the ground having a central arcuate bottom surface of a length substantially equal to the length of stroke of the conveyer and having opposite flattened ends forming continuations of said central arcuate bottom surface.

3. In a reciprocating conveyer, a pair of reciprocably movable conveyer troughs, means for connecting adjacent ends of said troughs together comprising a pair of connecting bolts disposed adjacent opposite sides of said troughs, and means for supporting said troughs for reciprocation comprising a rocking frame having bearing and supporting engagement with said bolts, said rocking frame including bearing members having convex bearing surfaces having rolling bearing and supporting engagement with said connecting bolts, and including a rocker having engagement with the ground, said rocker having a ground engaging surface of an arcuate formation, the length of the arc of which is substantially equal to the length of stroke of the conveyer and extends equally from opposite sides of a perpendicular line intersecting the center from which the arc of said convex surfaces of said bearing members is cast, when said rocker is in a central position on the ground, and having flattened ends extending from said central arcuate surface.

4. In a reciprocating conveyer, a pair of reciprocably movable conveyer troughs, means for connecting adjacent ends of said troughs together comprising a pair of connecting bolts disposed adjacent opposite sides of said troughs, and means for supporting said troughs for reciprocation comprising a rocking frame having bearing and supporting engagement with said bolts, said rocking frame including bearing members having convex bearing surfaces having rolling bearing and supporting engagement with said connecting bolts, and including a rocker having engagement with the ground, said rocker having a central ground engaging surface of an arcuate formation, the length of the arc of which is substantially equal to the length of stroke of the conveyer, the radius of which is greater than the distance from the bearing surface of said bearing members to the ground, which central arcuate ground engaging surface extends equally from opposite sides of a perpendicular line intersecting the center about which the arc of said arcuate surfaces of said bearing members is cast when said rocker is in a central upright position on the ground and the ends of said rocker being flattened.

5. In a reciprocating conveyer, a pair of reciprocably movable conveyer troughs, means for connecting adjacent ends of said troughs together comprising a pair of connecting bolts disposed adjacent opposite sides of said troughs, and means for supporting said troughs for reciprocation comprising a rocking frame having bearing and supporting engagement with said bolts, said rocking frame including bearing members having convex arcuate bearing surfaces having rolling bearing and supporting engagement with said connecting bolts, and including a rocker having engagement with the ground, said rocker having a central ground engaging surface of an arcuate formation, the length of the arc of which is substantially equal to the length of stroke of the conveyer, and said ground engaging surface having flattened ends forming continuations of the ends of said arcuate surface.

6. In a shaker conveyer, a pair of reciprocably movable conveyer troughs, connecting bolts disposed adjacent opposite sides of said troughs for connecting adjacent ends of said troughs together, and reciprocable support means for said troughs comprising a rocking frame having rocking engagement with the ground and bearing and supporting engagement with said connecting bolts, said connecting bolts being provided with heads having arcuate recessed races formed on the underside thereof and said frame being provided with spaced-apart bearing members adapted to have rocking bearing contact with said races.

7. In a shaker conveyer, a pair of reciprocably movable conveyer troughs, connecting bolts disposed adjacent opposite sides of said troughs for connecting adjacent ends of said troughs together and a rocking frame having bearing and supporting engagement with said connecting bolts, spaced-apart bearing members on said frame adapted to have rolling bearing contact with the under side of projecting and depending heads of said bolts, and stops on said frame disposed above said bearing members and arranged for engagement with said heads to prevent disconnection of said rocking frame from said bolts.

8. In a shaker conveyer, a pair of reciprocably movable conveyer troughs, connecting bolts disposed adjacent opposite sides of said troughs for connecting adjacent ends of said troughs together, and a rocking frame having bearing and supporting engagement with said connecting bolts, spaced-apart bearing members on said frame adapted to have rolling bearing contact with surfaces formed on the underside of projecting and depending heads of said bolts, stops on said frame disposed above said bearing members and adapted to engage said heads to prevent disconnection of said rocking frame from said bolts, and said rocking frame including a rocker engageable with the ground having a bottom rocking surface, a portion of which is in the form of an arc, the length of which arc is substantially equal to the length of the stroke of the conveyer and the ends of which are relatively straight.

9. In a shaker conveyer, a pair of reciprocably movable conveyer troughs, connecting bolts disposed adjacent opposite sides of said troughs for connecting adjacent ends of said troughs together, and a rocking frame having bearing and supporting engagement with said connecting bolts, spaced-apart bearing members on said frame adapted to have rolling bearing contact with the underside of projecting heads of said bolts, stops on said frame disposed above said bearing members to prevent disconnection of said rocking frame from said bolts, and said frame including a rocker engageable with the ground and having a bottom surface, the central portion of which is in the form of an arc of a greater radius than the distance from the bearing face of said bearing members to the ground and of a length substantially equal to the length of stroke of the conveyer.

10. In a shaker conveyer, a pair of reciprocably movable conveyer troughs, connecting bolts disposed adjacent opposite sides of said troughs for connecting adjacent ends of said troughs together, and a rocking frame having bearing and supporting engagement with said connecting bolts, spaced-apart bearing members on said frame adapted to have rolling bearing contact with the underside of projecting heads of said bolts, stops on said frame disposed above said bearing members and adapted to engage said heads to prevent disconnection of said rocking frame from said bolts, and said frame also including a rocker engageable with the ground and having a bottom rocking surface, the central portion of which is in the form of an arc of a greater radius than the distance from said bearing members to the ground and of a length substantially equal to the length of stroke of the conveyer, and the ends of which are relatively straight.

11. In a reciprocating conveyer, a pair of trough sections, means for connecting adjacent ends of said trough sections together, and means for supporting the ends of said troughs for reciprocable movement comprising a rocking frame having rocking engagement with the ground, said frame including a ground engaging rocker having an arcuate bottom surface of a length substantially equal to the length of stroke of the conveyer and having relatively straight ends extending from said arcuate bottom surface.

12. In a reciprocating conveyer, a pair of trough sections, means for connecting adjacent ends of said trough sections together, and means for supporting the ends of said troughs for reciprocable movement comprising a rocking frame having rocking engagement with the ground, said frame including a ground engaging rocker having a central arcuate bottom surface of a length substantially equal to the length of stroke of the conveyer and terminating into flattened ends.

13. In a reciprocating conveyer, a pair of trough sections, means for connecting adjacent ends of said trough sections together, means for supporting the ends of said trough sections for reciprocable movement comprising a rocking frame, said frame including a rocker engageable with the ground and upwardly disposed bearing members having convex bearing surfaces supporting adjacent ends of said trough sections above the ground and having rocking bearing engagement with said connecting means, the length of the arc of said rocker being substantially equal to the length of stroke of the conveyer and extending equally from opposite sides of a perpendicular line intersecting the center from which the arc of said convex bearing surface of said bearing members is cast, when said rocker is in an upright central position on the ground, and said rocker terminating into flattened ends.

14. In a reciprocating conveyer, a pair of trough sections, means for connecting adjacent ends of said trough sections together, means for supporting the ends of said trough sections for reciprocable movement comprising a rocking frame, said frame including a rocker engageable with the ground and upwardly disposed bearing members having convex bearing surfaces supporting adjacent ends of said trough sections above the ground and having rocking bearing engagement with said connecting means, the length of the arc of said rocker being substantially equal to the length of stroke of the conveyer and extending equally from opposite sides of a perpendicular line intersecting the center from which the arc of said convex bearing surface of said bearing members is cast, when said rocker is in an upright central position on the ground, and said rocker having flattened ends extending from said arcuate surface.

15. In a shaker conveyer trough line, a pair of conveyer troughs, means for connecting adjacent ends of said troughs together including a pair of connecting bolts extending through eye pieces at opposite sides of adjoining ends of said troughs, and means for supporting said troughs for reciprocation including a rocking frame adapted to rockingly engage the ground and a supporting connection between said frame and said connecting bolts for supporting adjacent ends of said troughs above the ground including a direct bearing supporting connection between said frame and said connecting bolts.

16. In a shaker conveyer trough line, a pair of conveyer troughs, means for connecting adjacent ends of said troughs together comprising a pair of connecting bolts extending through abutting longitudinally-extending eye pieces at opposite sides of adjoining ends of said troughs, each of said connecting bolts including a head having a recessed bearing engaging surface formed on the underside thereof, a rocking frame, and a direct bearing supporting connection between said frame and the recessed bearing surfaces of the heads of said connecting bolts for supporting adjacent ends of said troughs above the ground on said rocking frame.

WILLIAM W. SLOANE.